(12) United States Patent
Church et al.

(10) Patent No.: US 7,783,636 B2
(45) Date of Patent: Aug. 24, 2010

(54) PERSONALIZED INFORMATION RETRIEVAL SEARCH WITH BACKOFF

(75) Inventors: Kenneth W. Church, Seattle, WA (US); Qiaozhu Mei, Urbana, IL (US)

(73) Assignee: Microsoft Corporation, Redmond, WA (US)

( * ) Notice: Subject to any disclaimer, the term of this patent is extended or adjusted under 35 U.S.C. 154(b) by 245 days.

(21) Appl. No.: 11/529,134

(22) Filed: Sep. 28, 2006

(65) Prior Publication Data

US 2008/0082485 A1 Apr. 3, 2008

(51) Int. Cl.
G06F 7/00 (2006.01)

(52) U.S. Cl. ......... 707/732; 707/784

(58) Field of Classification Search ......... 707/104.1, 707/3, 100, 10, 5, 999.003
See application file for complete search history.

(56) References Cited

U.S. PATENT DOCUMENTS

| | | | |
|---|---|---|---|
| 6,169,986 B1 | 1/2001 | Bowman et al. ............... 707/5 |
| 6,289,353 B1* | 9/2001 | Hazlehurst et al. ............... 1/1 |
| 6,336,117 B1* | 1/2002 | Massarani ............... 707/711 |
| 6,421,675 B1* | 7/2002 | Ryan et al. ............... 1/1 |
| 6,701,309 B1* | 3/2004 | Beeferman et al. ............... 1/1 |
| 6,775,661 B1* | 8/2004 | Redner ............... 707/770 |
| 6,792,419 B1* | 9/2004 | Raghavan ............... 1/1 |
| 7,565,380 B1* | 7/2009 | Venkatachary ............... 1/1 |
| 2002/0002445 A1* | 1/2002 | Doliov ............... 703/2 |
| 2002/0107853 A1* | 8/2002 | Hofmann et al. ............... 707/7 |
| 2003/0101024 A1* | 5/2003 | Adar et al. ............... 702/187 |
| 2004/0243568 A1 | 12/2004 | Wang et al. ............... 707/3 |
| 2004/0254920 A1 | 12/2004 | Brill et al. ............... 707/3 |
| 2005/0065773 A1 | 3/2005 | Huang et al. ............... 704/7 |
| 2005/0065774 A1 | 3/2005 | Doganata et al. ............... 704/7 |
| 2005/0071328 A1 | 3/2005 | Lawrence ............... 707/3 |
| 2005/0102282 A1 | 5/2005 | Linden ............... 707/3 |
| 2005/0131866 A1 | 6/2005 | Badros et al. ............... 707/3 |
| 2006/0004850 A1 | 1/2006 | Chowdhury ............... 707/103 |
| 2006/0022048 A1* | 2/2006 | Johnson ............... 235/462.1 |
| 2006/0074883 A1 | 4/2006 | Teevan ............... 707/3 |
| 2006/0212265 A1 | 9/2006 | Amitay et al. ............... 702/182 |
| 2006/0248059 A1* | 11/2006 | Chi et al. ............... 707/3 |
| 2006/0282856 A1* | 12/2006 | Errico et al. ............... 725/46 |

OTHER PUBLICATIONS

Glen Jeh et al., "Scaling Personalized Web Search", pp. 1-24, *WWW2003*, May 20-24, 2003, Budapest, Hungary.ACM 1-58113-680-3/03/0005.
Dragomir R. et al., Mining the Web for Answers to Natural Language Questions, pp. 143-150, Proceedings of the tenth international conference on Information and knowledge management 2001.
Barry Smyth et al., A Live-User Evaluation of Collaborative Web Searches, 6 pages.

* cited by examiner

*Primary Examiner*—Khanh B Pham
*Assistant Examiner*—Eliyah S Harper
(74) *Attorney, Agent, or Firm*—Westman, Champlin & Kelly, P.A.

(57) ABSTRACT

Query logs are accessed to obtain queries, user information that specifies a user from which the query was received, a long with a selected result that was selected by the specified user who authored the query. This query log information is used to identify classes of users that looked for a similar result given a similar query. Those classes can then be used by a search engine in order to rank or provide search results to a user in response to a query input by the user.

14 Claims, 5 Drawing Sheets

PERSONALIZED INFORMATION RETRIEVAL SEARCH WITH BACKOFF

BACKGROUND

Performing information retrieval searches can be difficult. It has been observed that sometimes different people are looking for different search results, even though they input identical, or very similar, search queries. In order to address this problem, work has been done in attempting to personalize search engines. For instance, each time a search engine is used by a given user, data is collected for that user (such as query content and selected results) and the search engine is trained to return more accurately ranked search results in response to a future query entered by that user.

However, personalization of this type, itself, presents problems. One such problem is data sparseness. In other words, it takes a relatively long period of time to collect enough data to adequately personalize the search process for a given individual. Without sufficient data, personalization does not significantly improve search result accuracy.

Therefore, work has also been done in using collaborate filtering in the search process. Collaborative filtering attempts to group various queries together, given the query content. In other words, queries and results selected by users in response to those queries are analyzed to identify and group queries that have the same content. The selected results for each group of queries are then analyzed. The most often selected search results are identified for each of the group of queries. This information is used in order to assist in returning accurate search results in response to a future query.

However, this type of collaborative filtering can be costly. It requires some natural language analysis and classification of the content in each query. In addition, it has been found that different users may be seeking different results, even given queries that, when analyzed using natural language processing techniques, are drawn to similar, if not identical, content.

The discussion above is merely provided for general background information and is not intended to be used as an aid in determining the scope of the claimed subject matter.

SUMMARY

Query logs are accessed to obtain queries, user information that specifies a user from which the query was received along with a selected result that was selected by the specified user who authored the query. This query log information is used to identify classes of users that looked for a similar result given a similar query. Those classes can then be used by a search engine in order to rank or provide search results to a user in response to a query input by the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
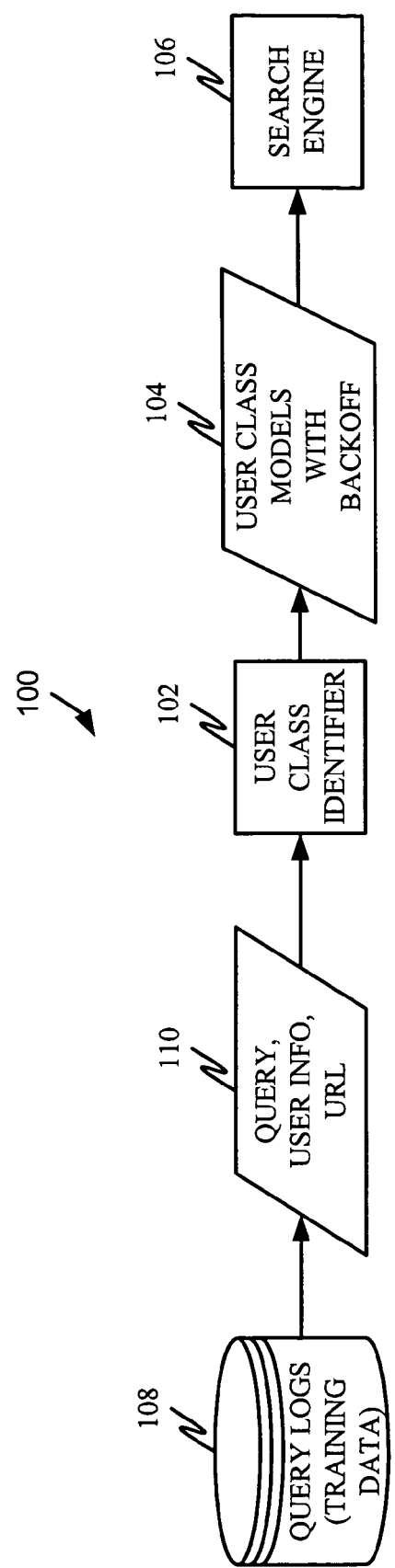
FIG. 1 is a block diagram of one illustrative system for identifying user classes from query logs.

FIG. 1 is a block diagram of one illustrative personalization system 100. System 100 personalizes search engine 106 sufficiently that search results can be more accurately presented to a user, but not so much that data sparseness prevents improvements in accuracy. System 100 illustratively includes a user class identifier component 102 that generates user class models and backoff models 104 for use in search engine 106. User class identifier 102 is also shown having access to a data store that stores query logs 108.

In one illustrative embodiment, the query logs are used as training data to train the class models and backoff models 104. Each record in query logs 108 illustratively includes at least three portions. The first portion is the query itself. The second portion is user information which specifies a user (in one of a plurality of different ways which will be discussed below) and the third portion is a uniform resource locator (URL) which represents the particular search result selected by the user from the results returned based on the query. A query log record is indicated by numeral 110 in FIG. 1.

A standard search problem is to find a URL that the user wants based on a query that was input by the user. In information theoretic terms, the size of the search base can be expressed in terms of entropy as follows: H(URL|query). It is well known how to estimate such entropy from empirical observations, such as from historical query logs 108.

It has been found that it is easier to answer the question of what URL a user desires, if the audience (the user that launched the query) is known, at least to some extent. In other words, the entropy of a personalized search task H(URL|query, user), is about half the entropy of the standard (completely impersonal) search task, H(URL|query). Improving entropy by a factor of two is a highly significant improvement.

It has also been found that using a backoff model can be very helpful. For instance, where a user is not completely specified, classifying the user into one of a plurality of classes or groups of users can provide a significant improvement in entropy. Therefore, it is not necessary to know the audience (the user) exactly. However, when possible, it is useful to know as much information about the user as is reasonable. Therefore, if the user is not known exactly, user class models and backoff models 104 can backoff to models that model larger and larger groups of users into which this specific user can be classified.

In one example, for instance, the IP address is used as a surrogate to identify the user. However, due to data sparseness or other problems, there may be insufficient statistics to adequately model a particular user using a full IP address. In that case, the model can backoff to using the high three bytes of the IP address. Again, if there are inadequate statistics for the high three bytes, the model can backoff to the high two bytes, to the high one byte, and even to zero bytes, if necessary. Of course, where the model backs off to zero bytes of the IP address, then there is no personalization of the search engine.

In one illustrative example, a simple backoff model is used where probabilities are expressed as a linear combination, as follows:

$$Pr(url|IP, query) = \lambda_0 Pr(url|IP_0, query) + \lambda_1 Pr(url|IP_1, query) + \lambda_2 Pr(url|IP_2, query) + \lambda_3 Pr(url|IP_3, query) + \lambda_4 Pr(url|IP_4, query) \quad \text{Eq. 1}$$

where $IP_i$ denotes the high i bytes of the IP address; and the λs are parameters that are fit to a held out training set of data using a standard parameter fitting method, such as the well known EM algorithm. In the embodiment set out in Eq. 1, it has been found that $\lambda_2$ and $\lambda_3$ are larger than the other λs. This tends to indicate that personalization with backoff is even more effective than complete personalization, and is also more effective than complete impersonalization. Once the classes (based on IP address) and the parameters for the model set out in Eq.1 are generated, a search engine 106 illustratively receives a query and IP address as an input during runtime, and then returns the k-best URLs that maximize Eq. 1, PR(URL|IP query).

Figure 2:
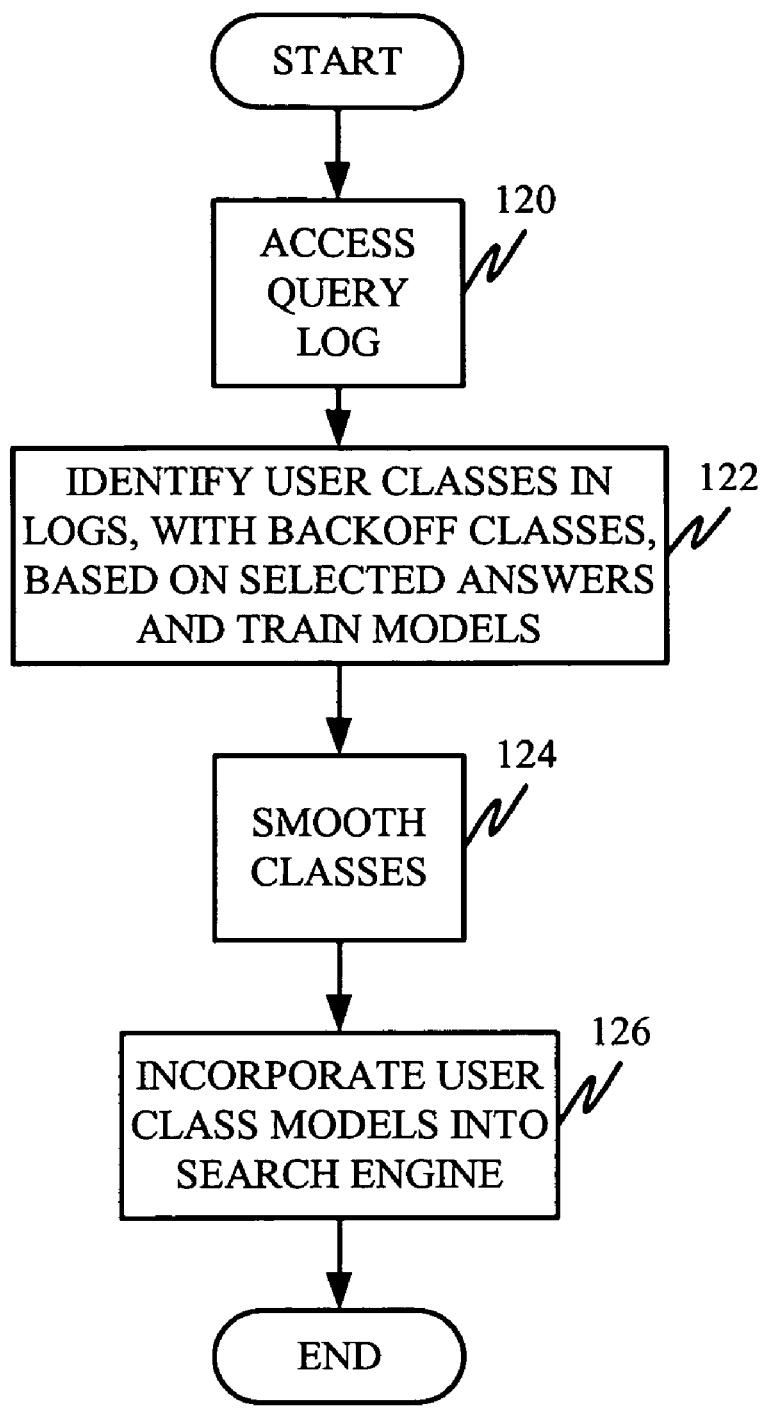
FIG. 2 is a flow diagram illustrating one illustrative embodiment of the operation of the system shown in FIG. 1.

FIG. 2 is a flow diagram illustrating one illustrative embodiment of the operation of system 100 shown in FIG. 1 in generating user class models and backoff models 104. In doing so, user class identifier 102 first accesses the query logs 108. This is indicated by block 120. User class identifier 102 then identifies user classes in the logs 108, along with backoff classes, based on the selected search results in the query log records 110. This is indicated by block 122 in FIG. 2. Identifying the user classes and backoff classes, in one embodiment, is performed by training a language model (such as that set out in Eq. 1) from the historical query logs 108. This can be done in any of a variety of known manners such as by using the EM algorithm as mentioned above. The class and backoff models, once generated by user class identifier 102, are then smoothed by user class identifier 102. Smoothing is indicated by block 124 in FIG. 2. Because the training data in query logs 108 is not infinite, there will be instances of <query, user information, URL> triples that are not seen in the training data. Therefore, some smoothing is required. In one embodiment, interpolation smoothing is used.

Having now identified the user classes, smoothed those classes, and generated a model (such as a language model) based on those classes, the model generated from those classes can now be incorporated into a search engine 106 for use during runtime. This is indicated by block 126 in FIG. 2.

Figure 3:
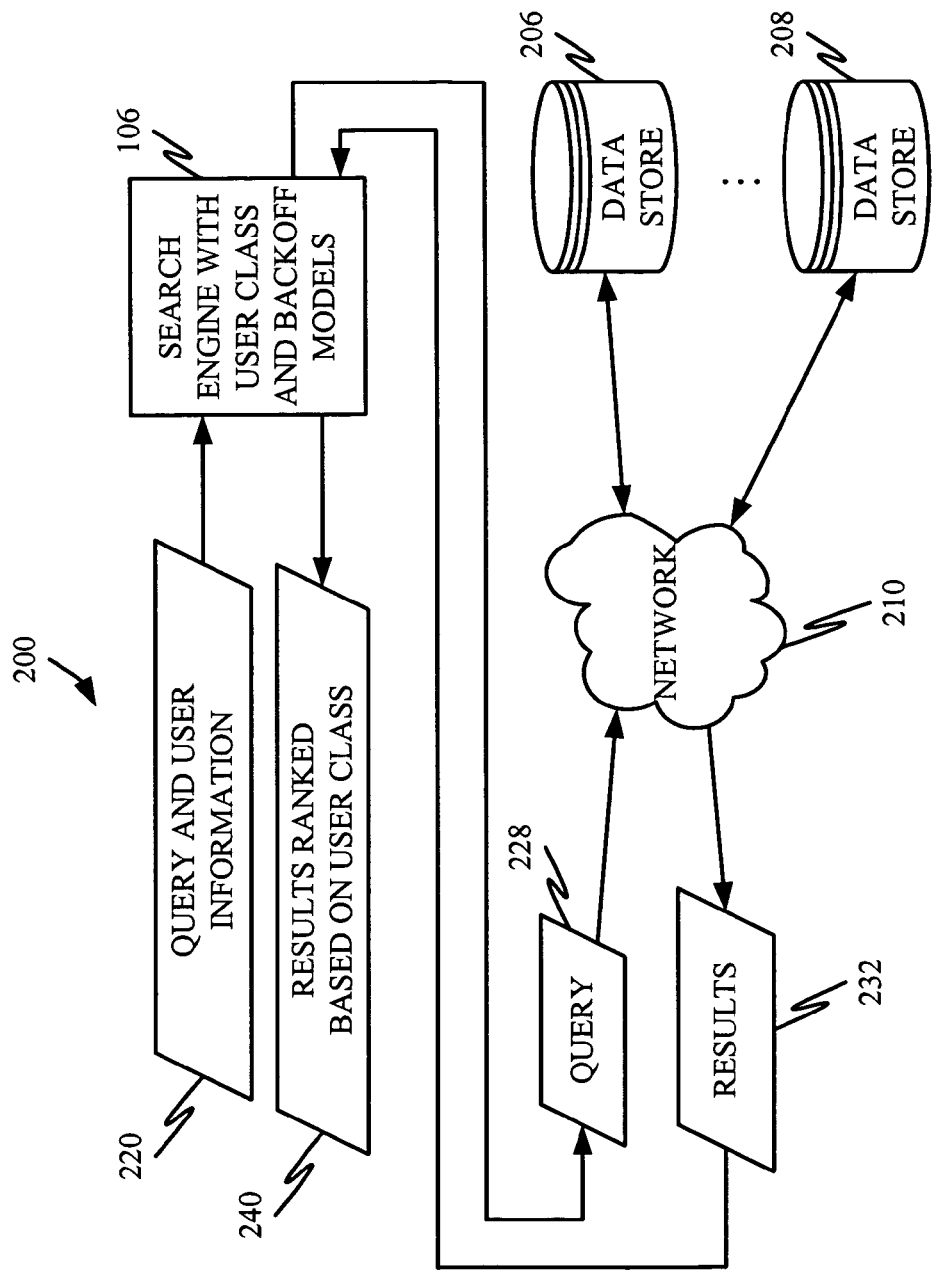
FIG. 3 is a block diagram of one illustrative embodiment of a search system with a search engine using user class models.
Figure 4:
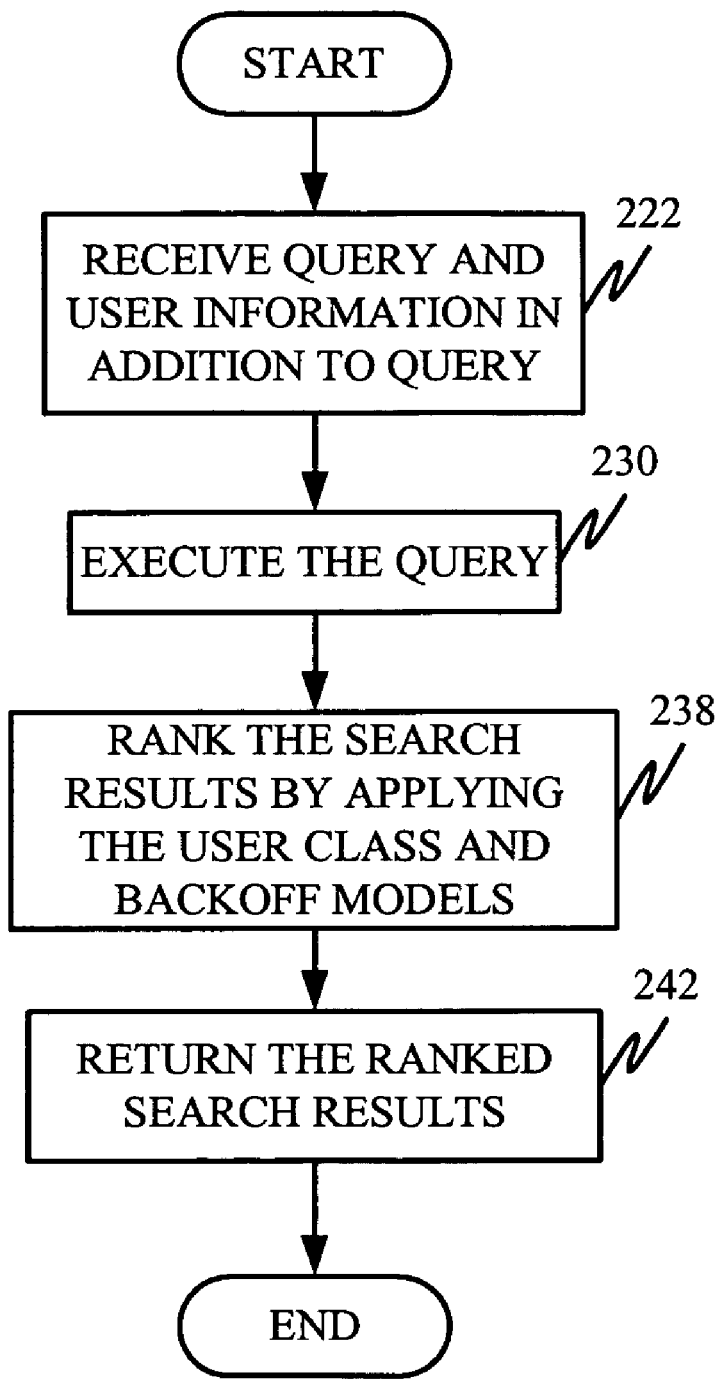
FIG. 4 is a flow diagram illustrating one illustrative embodiment of the operation of the system shown in FIG. 3.

FIG. 3 is a block diagram of a search system 200 that includes search engine 106 which incorporates the models 104 generated based on the user classes described above. FIG. 4 is a flow diagram illustrating the overall operation of the system shown in FIG. 3, in accordance with one embodiment.

System 200 illustratively includes search engine 106 connected to a plurality of data stores 206 and 208 through network 210. In one embodiment, network 210 is a wide area network, such as the Internet. Search engine 106 first receives a query and user information such as that indicated by 220 in FIG. 3. In the illustrative example being discussed, the query indicates the content that the user is searching for, and the user information is a specification of the user, such as the user's IP address (or at least one or more bytes of the user's IP address). Receiving the query and user information is indicated by block 222 in FIG. 4.

Search engine 106 then executes the query 228 against any of the various data stores 206-208, over network 210. This is indicated by block 230 in FIG. 4. Search engine 106 then obtains the search results 232 based on the query 228.

The search results are then ranked by applying the user class and backoff models 104 in search engine 106 and based on the query content. This serves to rank the search results based on an identification of the user indicated by the user class and backoff models 106. Ranking the search results based on user classification is indicated by block 238 in FIG. 4. The ranked search results 240 are then returned by search engine 106 to the user. This is indicated by block 242 in FIG. 4.

By ranking the search results based on the specification of the user, search engine 106 can better improve the accuracy of the search result ranking. An example may be helpful. Assume that a query input by a user is "MSG". This type of query is ambiguous in at least two ways. Some users will be looking for web pages about a food additive, whereas other users will be looking for a sports arena in New York City (Madison Square Garden). Using this example, it can be seen that it is not necessary to personalize a user completely in order to improve search accuracy. It is useful, however, to know as much about a user as is reasonable. It is also generally easier to collect information or statistics about classes of users (such as market segments), than to collect statistics about individual users, taken one at a time. In the example where "MSG" is the query, users can be identified by IP address. This acts as a surrogate to actually identifying the user, but can be used to significant advantage.

For example, given the query "MSG", an IP address in the New York area will likely be looking for Madison Square Garden. On the other hand, queries launched from users with IP addresses in different locations are likely to be looking for the food additive monosodium glutamate. Given the IP address, all users in the New York City area can be grouped into a class by models 104. Therefore, when the query for "MSG" is associated with an IP address in the New York area, search engine 106 will illustratively return search results corresponding to Madison Square Garden above those corresponding to the food additive.

In applying the models, search engine 106 can make use of separate backoff models, or the user class and backoff models can be combined or incorporated as desired (such as the linear combination in Eq. 1).

While the present discussion has proceeded with respect to specifying the user using one or more bytes of the IP address, any user information that serves to specify the user can be used. Table 1 shows user information and backoff information associated with the user information that can be used to train the user class and backoff models 104.

TABLE 1

| USER INFORMATION | BACKOFF |
|---|---|
| IP ADDRESS | NUMBER OF BYTES |
| PHYSICAL LOCATION | SIZE OF LOCATION |
| TIME OF DAY | SIZE OF TIME WINDOW |
| DAY OF WEEK | MULTIPLE DAYS |

Table 1 first shows that the user information can be the IP address and the backoff can be the number of bytes of the IP address which are used to model the user. Other similar user identifiers, such as global unique identifiers (GUIDs) can be used in a similar way.

Table 1 also shows that the user information can be a physical location of the user. The backoff can be the size of the physical location used to model the user. In one embodiment, the physical location is identified using longitude and latitude of a user. This information is input, along with the query, and queries are grouped based on a number of queries launched from different ranges of longitude and latitude measurements that define different physical locations. Where backoff is needed, those physical locations are enlarged to include additional users such that sufficient statistics are available to improve search result accuracy.

Another type of user information that can be used to model the user (as shown in Table 1) is the time of day the query was launched. The market can be segmented into business times and consumer times, since the two market segments use the Internet in different ways and have different needs and different willingness to pay. Businesses typically use the Internet during business hours and consumers use the Internet during weekend and primetime evening hours. However, there is also significant consumer use of the Internet during business hours. It has also been found that some queries are more popular during business hours and other queries are more popular during consumer hours. The fact that different segments use a search engine 106 at different times of the day can be exploited by the search engine 106 by using different models (such as different neural networks) for different days of the week and different times of the day. The backoff can simply be to expand the size of the time window used to model users.

The same is true for the days of the week. In other words, search engine 106 can use different neural networks or other models for queries executed during different days of the week. The backoff can be simply to expand the number of days used for modeling the user.

Of course, it will be noted that advertisers generally find it quite valuable to know the audience to which they are advertising. Therefore, by classifying the user as described herein, advertisers can do much more targeted advertising. Advertisements can be selected and displayed based on classification of the user by applying the user class and backoff models 104. Similarly, the system can suggest user action based on application of the user class and backoff models. For instance, it may be known that users of a certain class have requested certain articles. These things can be suggested to the user based on application of the user class and backoff models 104.

Figure 5:
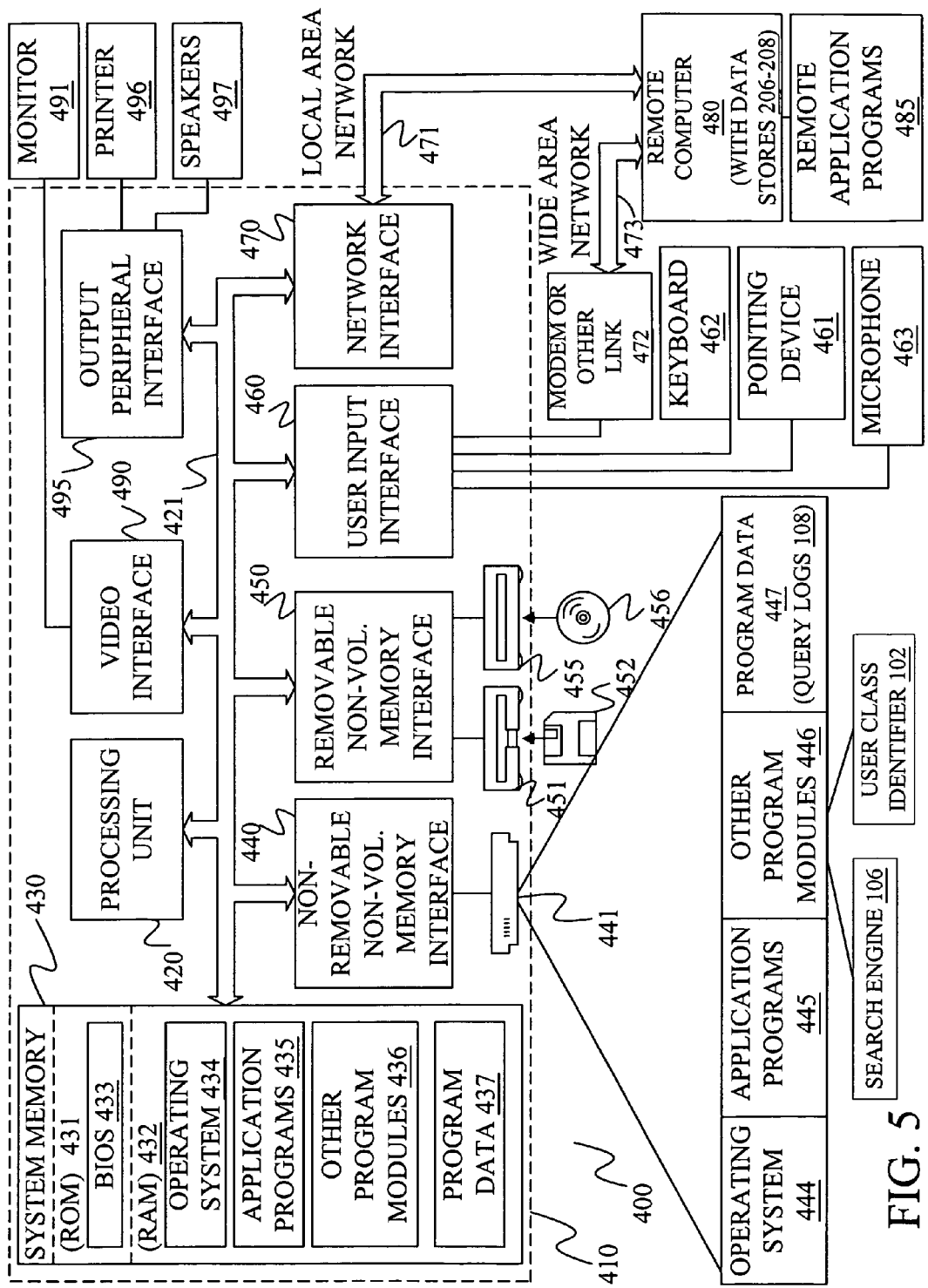
FIG. 5 is a block diagram of an illustrative computing environment.

FIG. 5 illustrates an example of a suitable computing system environment 400 on which embodiments may be implemented. The computing system environment 400 is only one example of a suitable computing environment and is not intended to suggest any limitation as to the scope of use or functionality of the claimed subject matter. Neither should the computing environment 400 be interpreted as having any dependency or requirement relating to any one or combination of components illustrated in the exemplary operating environment 400.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 5, an exemplary system for implementing some embodiments includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 5 illustrates operating system 434, application programs 435, other program modules 436, and program data 437.

The computer 410 may also include other removable/non-removable volatile/nonvolatile computer storage media. By way of example only, FIG. 5 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 5, provide storage of computer readable instructions, data structures, program modules and other data for the computer 410. In FIG. 5, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446 (which can include search engine 106 and user class identifier 102, although they can be located elsewhere as well), and program data 447 (such as query logs 108, although they can be stored elsewhere even remotely in a remote computer 480 or data store) are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. It can also include remote data stores 206-208, although they can be located elsewhere as well. The logical connections depicted in FIG. 5 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem (or other link) 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 5 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of retrieving information, comprising:

receiving a query and user information indicative of a user that initiated the query;

receiving search results based on the query;

utilizing a computer processor that is a component of the computer to apply to the search results a user class model that models a first set of user classes by grouping a plurality of users into multiple classes based on a first portion of an IP address of the plurality of users, said first portion being less than the complete IP address, and wherein applying the user class model to the search results further comprises applying the user class model so as to compare the user information to the first set of user classes so as to determine which of the search results are most likely desired by the user;

applying to the search results a backoff model that models a second set of user classes by grouping the plurality of users into multiple classes based on a second, smaller portion of the IP address of the plurality of users, said second portion being less than the complete IP address, and wherein applying the backoff model to the search results further comprises applying the backoff model so as to compare the user information to the second set of user classes so as to determine which of the search results are most likely desired by the user;

ranking the search results based on said applications of the user class model and the backoff model, wherein ranking the search results comprises ranking the search results not based on a complete indication of the identity of the user as reflected in the complete IP address but instead ranking the search results based on an incomplete indication of the identity of the user as reflected in the user class model and the backoff model; and returning the ranked search results to the user.

2. The method of claim 1, further comprising applying a plurality of additional backoff models that model successively larger user classes.

3. The method of claim 1 and further comprising:

generating and presenting the user with customized advertising selected based on a correlation to said ranking.

4. The method of claim 1 and further comprising:

presenting the user with a suggested user action selected based on said applications of the user class model and the backoff model.

5. A computer implemented method of managing a search engine, comprising:

accessing a query log including a record of queries previously executed, when each query in the record was processed, and a search result selected for each query in the record;

utilizing a computer processor that is a component of the computer to train a user class model that models a first set of classes by grouping the queries in the record into multiple groups based on when each query was processed;

weighting the user class model with weights;

utilizing the processor to train a backoff model that models a second set of classes by grouping the queries in the record into multiple groups based on when each query was processed;

weighting the backoff model using the weights, wherein weighting the backoff model comprises weighting the backoff model higher than the weighting of the user class model;

wherein there are more classes in the first set than the second set such that each class in the first set encompasses queries from a narrower time range than each class in the second set; and configuring the search engine to receive an input query, to receive a time indication indicative of the query, and to apply the user class model and backoff model to the time indication so as to facilitate a scoring of search results that correspond to the input query.

6. The method of claim 5 wherein training a backoff model comprises:

training a plurality of backoff models; and wherein weighting the backoff model comprises weighting each of the plurality of backoff models.

7. The method of claim 6 wherein combining comprises:

linearly combining the user class models with each of the plurality of backoff models.

8. A computer implemented method of retrieving information, comprising:

receiving a user query from a user along with user information indicative of a location from which the user submitted the query;

receiving search results based on the user query;

utilizing a computer processor that is a component of the computer to apply to the search results a geographic class model that models a first set of geographic classes by grouping a plurality of preexisting queries into multiple geographic classes based on which of a first category of geographic units is assigned to each of the preexisting queries, and wherein applying the geographic class model to the search results further comprises applying the geographic class model so as to compare the user information and the user query to the first set of geographic classes so as to determine which of the search results are most likely desired by the user;

applying to the search results a backoff model that models a second set of geographic classes by grouping the plurality of preexisting queries into multiple geographic classes based on which of a second category of geographic units is assigned to each of the plurality of preexisting queries, and wherein applying the backoff model to the search results further comprises applying the backoff model so as to compare the user information to the second set of geographic classes so as to determine which of the search results are most likely desired by the user, and wherein the first category of geographic units is smaller than the second category of geographic units in that a unit of the first geographic category encompasses less geographic space than a unit of the second geographic category;

ranking the search results based on said applications of the geographic class model and the backoff model; and returning the search results to the user.

9. The method of claim 8, wherein applying the backoff model comprises applying a plurality of backoff models that model successively larger user classes.

10. The method of claim 8 and further comprising generating advertising based on application of the user class model.

11. The method of claim 8 and further comprising suggesting to the user a user action based on application of the user class model.

12. The method of claim 8 and further comprising weighting and combining the first and second sets of geographic classes.

13. The method of claim 12 wherein weighting comprises weighting the second set of geographic classes higher than the first set of geographic classes.

14. The method of claim 12 wherein combining comprises linearly combining the first and second sets of geographic classes.

* * * * *